Patented Feb. 19, 1935

1,991,694

UNITED STATES PATENT OFFICE 1,991,694

CHANGE SPEED TRANSMISSION MECHANISM (SHIFTING MECHANISM FOR ADDITIONAL GEAR RATIO)

Carl D. Peterson, Toledo, Ohio, assignor to Spicer Manufacturing Corporation, Toledo, Ohio, a corporation of Virginia Original application March 16, 1932, Serial No. 599,229. Divided and this application August 14, 1933. Serial No. 684,999

3 Claims. (Cl. 74—338)

This invention relates to change speed transmission gearing having shiftable elements, and of the type used in motor vehicles, and has for its object a simple and efficient arrangement of an additional gear change in a conventional transmission gearing, as an additional reverse gear. The mechanism for effecting the shifting of the additional gear constitutes the subject matter of my pending application, Sr. No. 599,229, filed March 16, 1932, of which this application is a division.

The invention consists in the novel features and in the combinations and constructions hereinafter set forth and claimed.

In describing this invention, reference is had to the accompanying drawings in which like characters designate corresponding parts in all the views.

This change speed gearing includes generally, the usual drive, transmission and countershafts mounted in the usual gear box, gearing between said shafts including shiftable elements to produce for regular forward speeds, and reverse, and shifting mechanism, including the usual shift rods, and a selecting and gear shifting lever coacting therewith, additional gearing between the countershaft and the transmission shaft including an idler, and an additional gear on the transmission shaft, one of these additional gears being shiftable into and out of mesh with the other, and being normally out of mesh therewith, and shifting mechanism for said shiftable gear.

Figure 1:
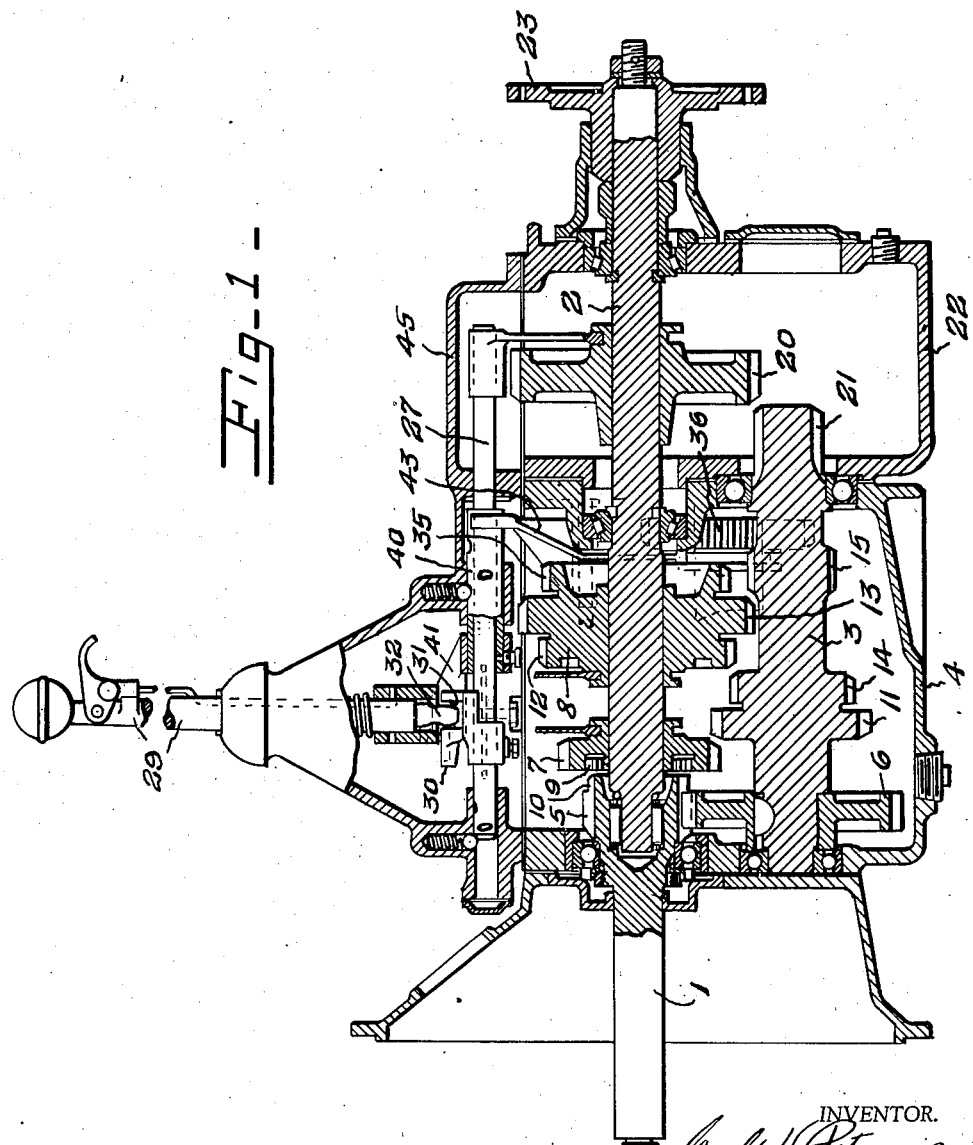
Figure 1 is a longitudinal, sectional view of a gearing embodying my invention.
Figure 2:
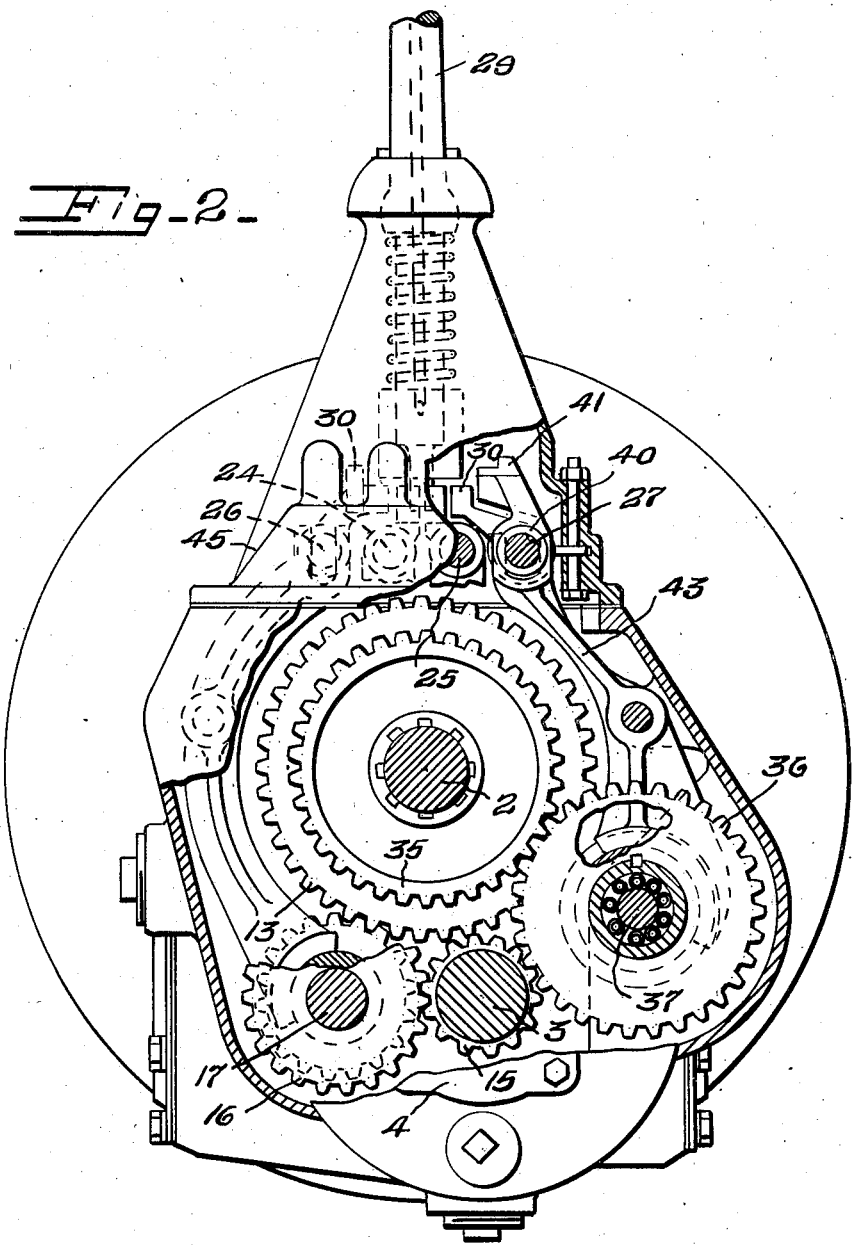
Figure 2 is an end view illustrating the arrangement of the reverse gearing.
Figure 3:
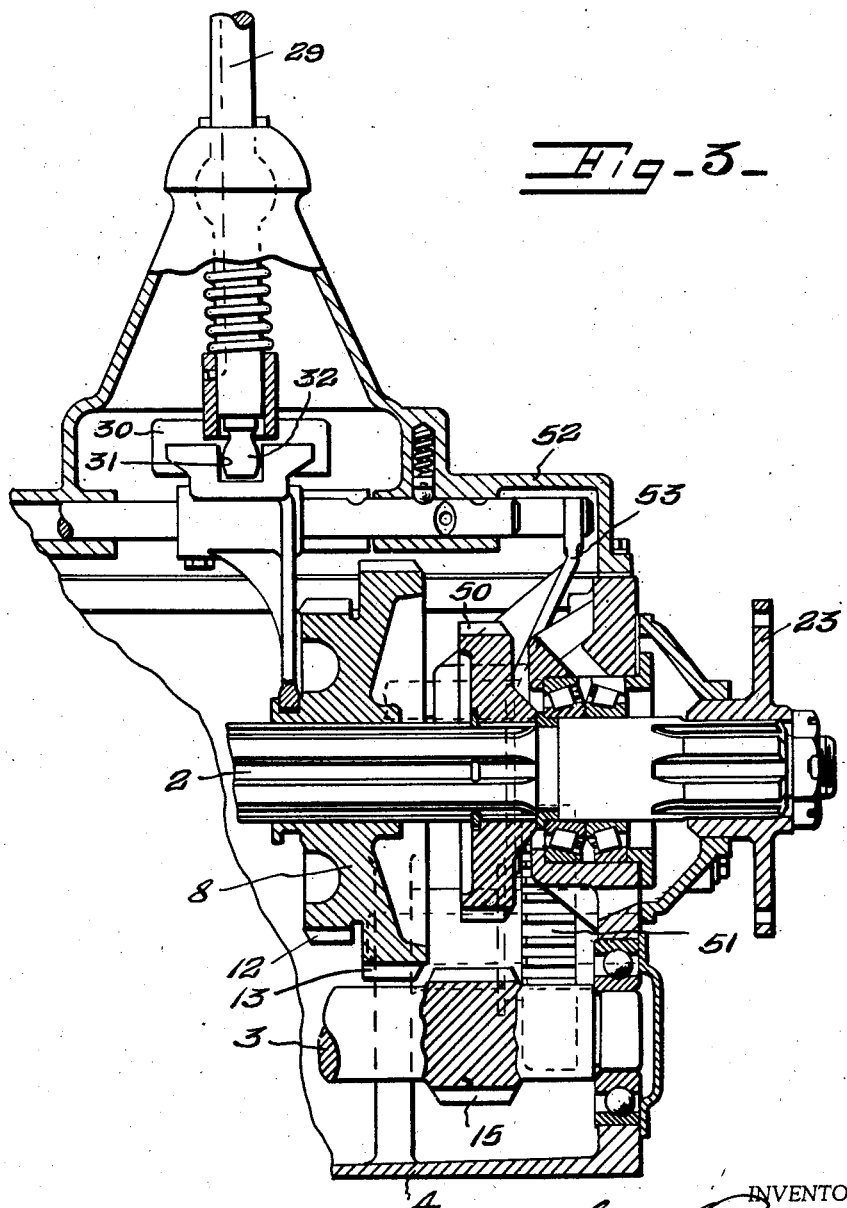
Figure 3 is a fragmentary, sectional view, similar to Figure 1, of a modified arrangement of a gearing embodying my invention.

In Figure 1, 1, 2, and 3, designate respectively, the drive, transmission, and countershafts, of a standard sliding gear transmission gearing, these being suitably mounted in a gear box 4. The shaft 1 is connected to the engine of the vehicle, in which the gearing is installed, through the usual clutch, not shown, one element of which is mounted on the shaft 1. The gearing between these shafts comprises intermeshing gears 5 and 6 mounted respectively on the drive shaft 1, and the countershaft 3, sliding gears 7 and 8 mounted on the transmission shaft and shiftable into and out of mesh with gears on the countershaft. The gear 7 has a clutch face 9 for coacting with a complemental clutch face 10 on the gear 5. The gear 7 is shiftable to the left from neutral, Figure 1, to engage the clutch faces to produce high or fourth speed, and to the right from neutral into mesh with the gear 11 on the countershaft to produce third speed forward. The gear 8 is a double gear including gears 12 and 13, and is shiftable to the left from neutral to engage the gear 12 with the gear 14 on the countershaft to produce second speed forward and to the right from neutral to engage the gear 13 with the gear 15 on the countershaft to produce first or low speed forward.

To produce reverse, an idler 16, which is composed of a double gear, or spool, mounted on a stud 17 on the rear wall of the gear box 4, is shiftable into mesh with the gear 13, and the gear 15 when the gear element 8 is in neutral position. Thus, the gears within the main gear box are operable in the usual manner to produce four forward speeds, and one reverse.

In Figure 1, an additional, or emergency, low speed is provided consisting of a slidable gear 20 on the transmission shaft, and normally out of mesh with a gear 21 on the countershaft and shiftable into mesh therewith. The gear 20 is mounted in an auxiliary gear box 22 which is detachably secured, as by screws or bolts not shown, to the rear wall of the main gear box 4, and the transmission shaft extends through the auxiliary gear box 22 and is provided with means, as a universal joint, for connection to the propeller shaft of the vehicle. 23 designates a section of the universal joint.

The countershaft 3 also extends at its rear end into the auxiliary gear box, and the gear 21 is cut on the rear end thereof.

The gears 7, 8, and 20, and idler 16 are shifted in the usual manner by gear shifting mechanism including rods 24, 25, 26, and 27, which are connected by forks to the gears 7, 8, 16, and 20, respectively, and a selecting and gear shifting lever 29 for coacting with the rods in the usual manner, that is, each rod is provided with a block, as 30, having a notch 31 therein, the notches being arranged in transverse alinement when the rods are in neutral position, in order that the finger 32 at the lower end of the gear shifting lever may coact therewith. The unshifted rods are held from movement by the shifting of any one rod by the usual locking mechanism.

The additional reverse is provided by an additional gear on the transmission shaft, and an additional idler between the countershaft and the additional gear on the transmission shaft, the additional gears being normally out of mesh, and one of them being shiftable into and out of mesh with the other.

In the gearing shown in Figure 1, 35 designates the additional gear on the transmission shaft, this being shown as formed as a unit with the gear element 8 on the rear end thereof.

36 designates the additional idler, this being mounted on a stud or shaft 37 in the main gear housing at one side of the transmission shaft, and the additional idler is shiftable axially into mesh with the gear 15 on the countershaft, and the gear 35 to produce another reverse gear ratio between the countershaft and the transmission shaft.

The shifting mechanism for this additional idler is correlated with the regular gear shifting mechanism so that additional shift rods are unnecessary, and as here illustrated, the idler 36 is shifted by means of a sleeve 40 slidably mounted on one of the shift rods 24, 25, 26, or 27, and is provided with a block 41 having a notch for coacting with the finger 32 of the shifting lever 29 in the same manner that the finger coacts with the notches 31 of the block 3. The sleeve is provided with a fork 43 coacting with the additional idler 36 to slide the same on its shaft.

In the illustrated embodiment of my invention, the sleeve is mounted on the emergency low speed rod 27 so that the two added gear changes are grouped togther, that is, the emergency low, and the additional, or emergency reverse. The shift rods are slidably mounted on the cover 45 for the gear box in the usual manner.

The shifting mechanism forms no part of this application, but is embodied in my pending application before referred to.

In Figure 3, the additional gear 50, corresponding to the gear 35, instead of being integral with the shiftable gear element 8, is an additional gear fixed on the rear end of the transmission shaft and in the gear box 4, and the idler 51 is shiftable into and out of mesh therewith.

In the gearing shown in Figure 3, there is no emergency low and hence no emergency low speed shift rod, and additional reverse is effected, that is, the idler 51 is shifted by a shift rod 52 connected thereto by a fork 53.

In Figure 3, the regular or standard forward speeds and reverse are effected substantially as in Figure 1 or as in any conventional selective sliding gear change speed gearing. Also, the rod 52 is selected and shifted by the gear shifting lever the same as any other rod, but the rod 52 shifts the idler 51 into and out of mesh with an additional gear 50 on the transmission shaft, which additional gear is not combined with the double gear 8 as in Figure 1.

What I claim is:

1. In a change speed transmission which includes a drive shaft gear, a countershaft having a gear in mesh with the drive shaft gear, whereby the countershaft is driven by the drive shaft, a transmission shaft, a driving gear on the countershaft, a shift gear on the transmission shaft shiftable into and out of engagement with said driving gear, a set of idler gears fixed for unitary movement shiftable into and out of engagement with said driving gear and said shiftable gear on the transmission shaft, the combination of an additional gear rotatable with the transmission shaft with its teeth spaced apart from and opposed to the teeth of said driving gear on the countershaft, and a single idler gear shiftable into and out of engagement with said driving gear on the countershaft and said additional gear on the transmission shaft.

2. In a change speed transmission which includes a drive shaft gear, a countershaft having a gear in mesh with the drive shaft gear, whereby the countershaft is driven by the drive shaft, a transmission shaft, a driving gear on the countershaft, a shift gear on the transmission shaft shiftable into and out of engagement with said driving gear, a set of idler gears fixed for unitary movement shiftable into and out of engagement with said driving gear and said shiftable gear on the transmission shaft, the combination of a gear having a unitary structure with said shift gear on the transmission shaft and having its teeth spaced apart from and opposed to the teeth of said driving gear on the countershaft when said shift gear is in disengaged position, and a single idler gear shiftable into and out of engagement with said driving gear on the countershaft and said gear forming a unitary structure with said shift gear.

3. In a change speed transmission which includes a drive shaft gear, a countershaft having a gear in mesh with the drive shaft gear, whereby the countershaft is driven by the drive shaft, a transmission shaft, the combination of a pair of driving gears of different diameter on the countershaft, a set of three gears forming a unitary structure shiftably mounted on the transmission shaft, two adjacent gears of said unitary structure extending between the opposing ends of the teeth of the pair of driving gears on the countershaft, said unitary structure being shiftable in opposite directions to engage the two adjacent gears with the pair of driving gears respectively, the third gear of said unitary structure having its teeth opposing the teeth of one of said pair of driving gears and spaced apart therefrom, when said two adjacent gears are out of engagement with the said pair of driving gears respectively, and a single idler gear shiftable into and out of engagement with said third gear and said opposing driving gear on the countershaft.

CARL D. PETERSON.